US005339996A

United States Patent [19]

Dubbert et al.

[11] Patent Number: 5,339,996

[45] Date of Patent: Aug. 23, 1994

[54] PORTABLE MINI SILO SYSTEM

[75] Inventors: Patrick C. Dubbert, Cole County; Nathan R. Neely, Callaway County; Daniel L. Albertson, Maries County; Norbert A. Luebbert, Osage County, all of Mo.

[73] Assignee: Midwest Pre-Mix, Inc., Jefferson City, Mo.

[21] Appl. No.: 52,590

[22] Filed: Apr. 26, 1993

[51] Int. Cl.[5] .......... G01F 11/24

[52] U.S. Cl. .......... 222/185; 182/85; 182/179; 414/498; 414/608

[58] Field of Search .......... 222/185, 192; 366/6, 366/8, 9, 16, 18, 341; 182/85, 179; 414/498, 608

[56] References Cited

U.S. PATENT DOCUMENTS

| | | | |
|---|---|---|---|
| 1,309,671 | 7/1919 | Weaver | 366/9 |
| 1,626,389 | 4/1927 | Butler | 222/185 |
| 1,760,094 | 5/1930 | Tolman, Jr. | 222/185 X |
| 2,299,702 | 10/1942 | Mosel | 222/129 X |
| 2,670,866 | 3/1954 | Glesby | 414/608 |
| 2,782,011 | 2/1957 | Fitzgerald | 222/185 X |
| 3,125,254 | 3/1964 | Schuette, Jr. | 222/185 |
| 3,278,081 | 10/1966 | Carter | 222/185 X |
| 3,301,441 | 1/1967 | Werner et al. | 222/146.1 X |
| 3,305,138 | 2/1967 | Plumb | 222/185 X |
| 3,318,473 | 5/1967 | Jones et al. | 222/185 X |
| 3,343,688 | 9/1967 | Ross | 366/18 X |
| 3,435,993 | 4/1969 | Hunkel | 222/195 |
| 3,658,211 | 4/1972 | Kitchens | 222/185 |
| 3,998,362 | 12/1976 | Lapierre et al. | 222/185 |
| 4,358,205 | 11/1982 | Eakins | 366/341 X |
| 4,953,752 | 9/1990 | Tousignant et al. | 222/23 |
| 4,956,821 | 9/1990 | Fenelon | 366/8 |
| 4,997,284 | 3/1991 | Tousignant | 366/8 |
| 4,998,982 | 3/1991 | Arnold et al. | 182/159 |
| 5,064,022 | 11/1991 | Graham | 182/85 |
| 5,182,057 | 1/1993 | Johnson | 414/608 X |
| 5,236,261 | 8/1993 | Hagenbuch | 414/498 X |

*Primary Examiner*—Kevin P. Shaver
*Attorney, Agent, or Firm*—Polster, Lieder, Woodruff & Lucchesi

[57] ABSTRACT

A portable mini silo system for delivering dry mortar blends to batch mixers is disclosed. Such system includes a silo that is constructed for portable transport to a construction site, while providing support for the silo at the construction site, through the use of telescopic leg elements. The telescopic leg elements are suitably reinforced and mounted to the silo to provide both lateral offset and reinforcement. A collapsible ladder is attached to one of the telescopic leg elements for collapse and extension as one of the leg elements is collapsed and extended. The collapsible ladder, when extended at a construction site, enables a user to load dry mortar blends into the silo. A platform is also attached to the silo side wall and cooperates with the collapsible ladder to enable a user to climb the ladder and stand on the platform, thus facilitate loading and checking the contents of the silo. For efficient use and operation of the silo, an upper loading door, together with a lower discharge valve and vertical and horizontal struts, cooperate to provide a portable silo system that is structurally reinforced, while enabling efficient delivery and discharge of dry mortar blends into a batch mixer.

12 Claims, 3 Drawing Sheets

PORTABLE MINI SILO SYSTEM

BACKGROUND OF THE INVENTION

The present invention relates to a portable mini silo system for delivering dry mortar blends to batch mixers at a construction site.

It is well known that there are a number of techniques which have been employed for delivering and/or preparing mortar products at a construction site. Such mortar products include conventional concrete-type mixes, brick and mason mortar mixes and various types of grout mixes.

For concrete-type applications, concrete trucks are typically employed. Thus, the concrete-type mortar product is prepared off site and is delivered by the concrete truck to the construction site. The concrete-type mix is discharged by using various telescoping or expanding chutes, associated with the concrete truck, for delivering the concrete-type mix. Such off-site preparation has been generally used for concrete-type products.

For brick and mason mortar-type products and grout mixes, the mortar product has been typically prepared at the job site. In such instances, a batch mixer is employed for mixing mortar blend materials with water to produce the desired mortar product. Such batch mixers are either of the typical paddle wheel or rotary drum batch mixer type or a continuous batch mixer using a rotatable screw or auger member. In either case, the mortar blend and water is mixed and then discharged from the batch mixing apparatus for use.

Typically, desired proportions of the mortar blend must be hand loaded into either type of mixer. As will be appreciated, not only is such hand loading labor intensive, but the mortar product produced varies from batch to batch since there is no accurate way of insuring preparation of the specific type of mortar product desired.

Recently, there have been several developments which have sought to eliminate the myriad of problems associated with construction site preparation of mortar products. One system employs a portable ready-mix plant for preparing the desired mortar product at the construction site. Another system employs a mobile concrete dispenser which comprises a complete concrete truck type transportation, proportioning and mixing system for preparing the desired mortar product. A third system includes a portable silo system, containing the desired dry mortar blends, which is then transported to a job site and then selectively discharged for mixture with water to provide the desired mortar product. Still another system, shown in U.S. Pat. No. 4,956,821, employs a silo that is loaded with a dry mortar blend product at the construction site for a discharge into a batch mixer in preparing the desired mortar product. All of the aforementioned systems are disclosed in aforementioned U.S. Pat. No. 4,956,821.

The present invention is generally of the type disclosed in U.S. Pat. No. 4,956,821 where a silo is individually charged at the construction site with a dry mortar blend mixture for subsequent selective discharge into a batch mixer in preparing the desired mortar product.

SUMMARY OF THE INVENTION

Among the several objects and advantages of the present invention include:

The provision of a new and improved portable mini silo system which provides portability to a construction site, while enabling easy loading and quick discharge of dry blend material from the silo at the construction site;

The provision of the aforementioned portable mini silo system which provides spaced telescopic leg elements for collapse when moving the silo to a construction site and for extension at the construction site, to enable the silo to be positioned á predetermined distance above a supporting surface;

The provision of the aforementioned portable mini silo system which includes a collapsible ladder attached to one of the telescopic leg elements to facilitate collapse and extension along with the one telescopic leg element;

The provision of the aforementioned portable mini silo system which includes a user platform that is attached to the silo and cooperates with the collapsible ladder to provide a convenient platform for hand loading or checking the contents of the silo;

The provision of the aforementioned portable mini silo system which also includes an offset door in a closed upper wall of the silo that is located near the platform, to enable charging the silo without the need for a fork lift truck, while eliminating the need to climb on top of the silo to charge or check the dry mortar blend level in the silo;

The provision of the aforementioned portable mini silo system which includes structurally integrated vertical and horizontal struts that provide for a rigid supporting system, while at the same time accommodating the telescopic leg elements;

The provision of the aforementioned portable mini silo system which provides for quick discharge of the dry mortar blend from the silo in selective amounts through manual operation without the need for a powered system;

The provision of the aforementioned portable mini silo system which is usable by both the small contractor, where dry mortar blend materials are hand loaded into the silo or larger contractors, where fork lift loading of the dry mortar blend from large containers can be accomplished; and The provision of the aforementioned portable mini silo system which is simple to construct and operate, made of a minimum number of parts, is durable and long lasting and is otherwise well adapted for the purposes intended.

Briefly stated, the portable mini silo system of the present invention is constructed for delivering dry mortar blends to batch mixers. The system includes a silo having a peripherally continuous side wall with an upper and lower area. The upper area of the side wall is generally vertically directed and terminates at an upper end in a closed upper wall. The lower area of the side wall tapers downwardly and terminates at a lower end in a restricted opening. Loading means are associated with the closed upper wall for selectively filling dry mortar blends through an opening in the closed upper wall of the silo. Unloading means are associated with the restricted opening for unloading the dry mortar blend from the silo into a batch mixer. Telescopic leg elements are peripherally spaced about and are attached to the upper area of the silo side wall for supporting the silo in a upright position. The leg elements are constructed for telescopic collapse enabling portable movement of the silo and telescopic extension for supporting the silo a predetermined distance above a supporting surface. The telescopic leg elements are laterally offset outwardly from the silo to provide additional clearance below the silo for operation and use of the portable batch mixer.

The peripherally continuous upper area of the side wall may be of any shape or configuration, but is preferably generally cylindrically shaped.

Vertical struts are mounted between the silo and the telescopic leg elements to both laterally offset and reinforce the telescopic leg elements. In addition to the vertical struts, horizontal struts extend between and are attached to adjacent fixed leg portions of the telescopic leg elements. The fixed leg portions comprise tube members which receive sliding leg portions of the telescopic leg elements.

A collapsible ladder is attached to one of the telescopic leg elements for collapse and extension as one of the telescopic leg elements is collapsed and extended. The collapsible ladder extends upwardly a sufficient distance along the silo side wall to enable a user to load dry mortar blends into the upper closed wall through the loading means.

A platform is attached to the side wall of the silo below the closed upper wall at the upper end of the silo, with the collapsible ladder also being attached to the platform to enable a user to climb the ladder and stand on the platform for charging or checking the contents of the silo. The platform is also attached to fixed leg portions of adjacent telescopic leg elements. A guard rail extends upwardly from the platform along one side and a vertical strut between a silo and an adjacent telescopic leg element serves as a guard rail along another side of the platform.

The loading means is preferably a pivoting loading door that is mounted to the closed upper wall of the silo. The pivoting loading door is laterally offset in the closed upper wall adjacent the platform to facilitate loading and checking the contents of the silo when a user stands on the platform.

The unloading or discharge means comprises a valve that cooperates with the restricted opening at the lower end of the silo for selectively dispensing dry mortar blend into a batch mixer as desired. The valve constituting the unloading or discharge means is connected to a manual operating arm that is located at the rear of a batch mixer mounted between the telescopic leg elements. The valve preferably is an inverted half-clam cement valve for selective discharge of dry mortar blends from the silo, upon operation of the manual operating arm.

Horizontally mounted fork lift tubes extend on opposite sides of the silo and are mounted to the horizontal struts between the telescopic leg elements to enable a fork lift truck to lift and move the silo to a desired location.

These and other objects and advantages of the present invention will become apparent from the description that follows.

Figure 1:
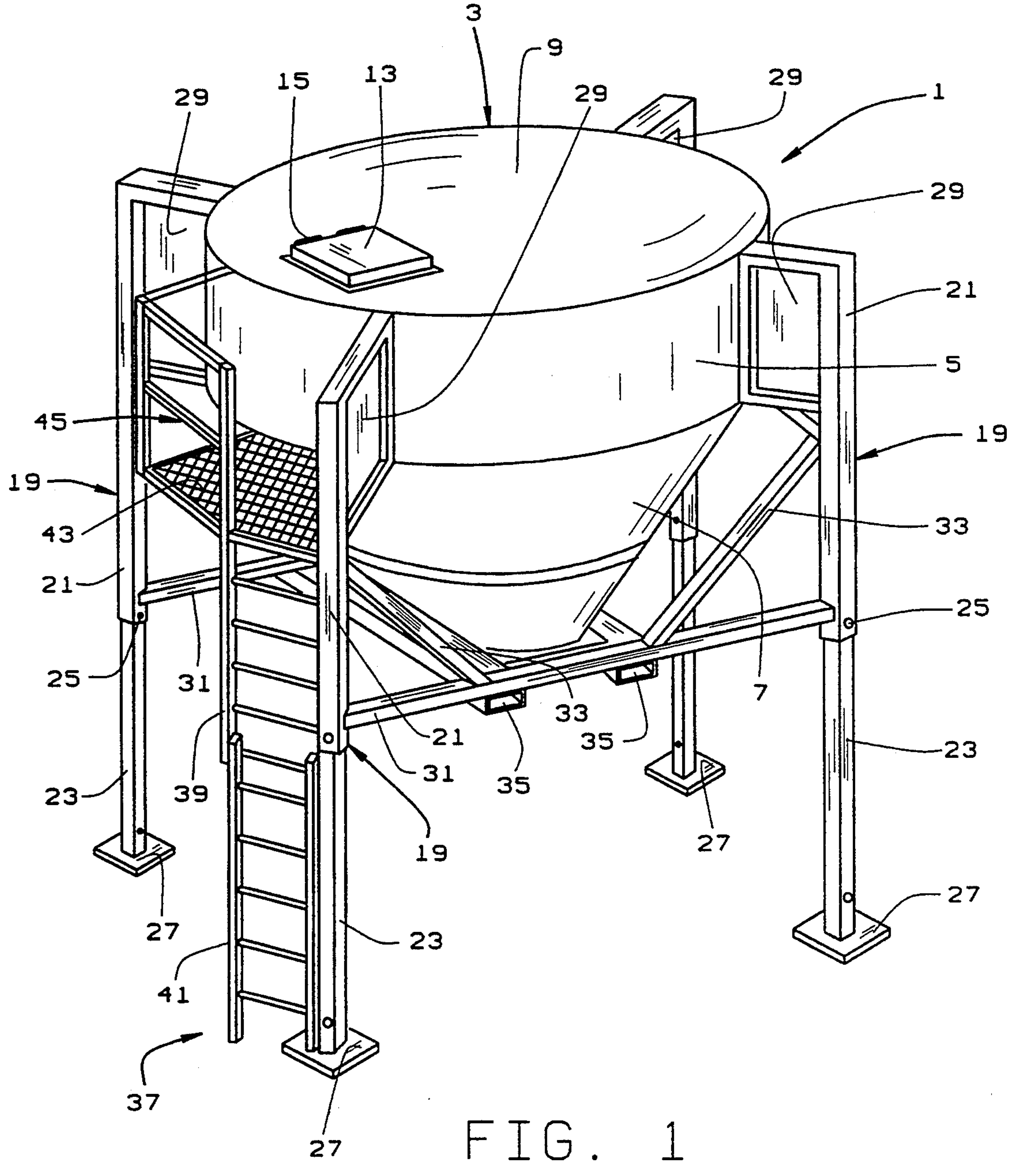
FIG. 1 is a perspective view of the portable mini silo system of the present invention in operational condition.

Corresponding references numerals will be used throughout the various figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

In the discussion that follows, the term "batch mixer" is intended to apply to either the paddle wheel or rotary drum batch type mixer or the continuous batch mixer using a rotatable screw or auger member. Typically, the paddle wheel or rotary drum batch type mixer is a separately mounted unit, while the continuous batch mixer is generally attached to the lower end of the silo for selective discharge of the silo contents. An example of the paddle wheel or rotary drum batch type mixer that is separate from the silo itself is shown in U.S. Pat. No. 4,956,821, while an example of the continuous batch mixer attached to the lower end of the silo is shown in U.S. Pat. No. 4,384,787.

It is also to be noted that the term "dry mortar blend" as used previously, as well as in the subsequent discussion, is intended to include various types of concrete-type mixes, brick and mason mortar mixes and grout mixes formed as dry blend mixes, as desired by the user.

As illustrated in the drawings, the portable mini silo system 1 of the present invention includes a silo 3 having a peripherally continuous side wall with an upper area 5 and a lower area 7. The upper area 5 is generally vertically directed and terminates at an upper end in a closed upper wall 9. The lower area 7 of the side wall tapers downwardly and inwardly from the upper side wall area 5 and terminates at a lower end in a restricted opening 11 (See FIGS. 3–4). Pre-mixed dry mortar blends are loaded into the silo 3 through the loading door 13 that is pivotally mounted at 15 to the closed upper wall 9. As will be explained below, the loading door 13 is offset to one side of the closed upper wall 9. Unloading means in the form of a valve 17 (See FIG. 4) selectively unloads the dry mortar blend from the silo 3 into a batch mixer that is attached to the silo 3 at its lower end or into a separately mounted batch mixer, as explained above.

Figure 2:
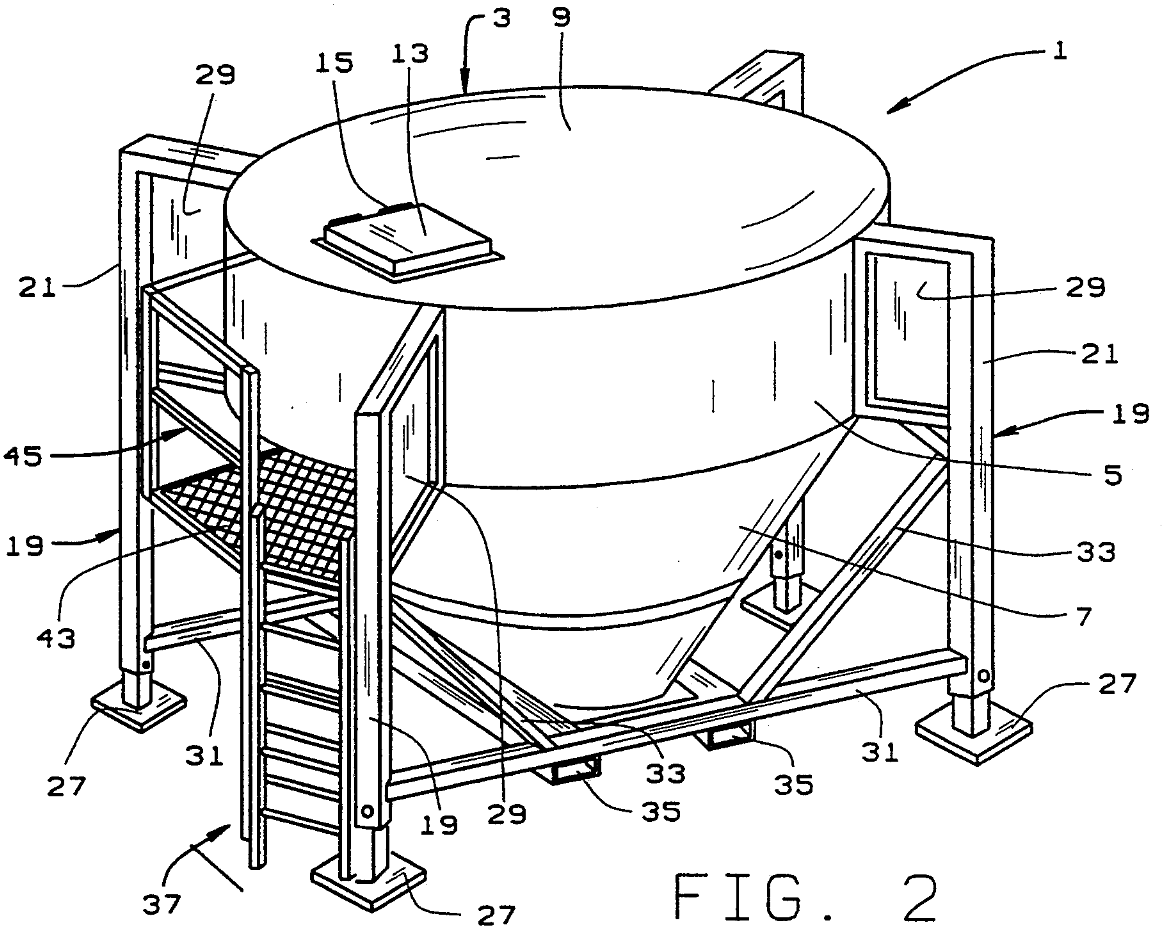
FIG. 2 is also a perspective view of the portable mini silo system of the present invention in collapsed condition when the telescopic leg elements are collapsed for portability.
Figure 3:
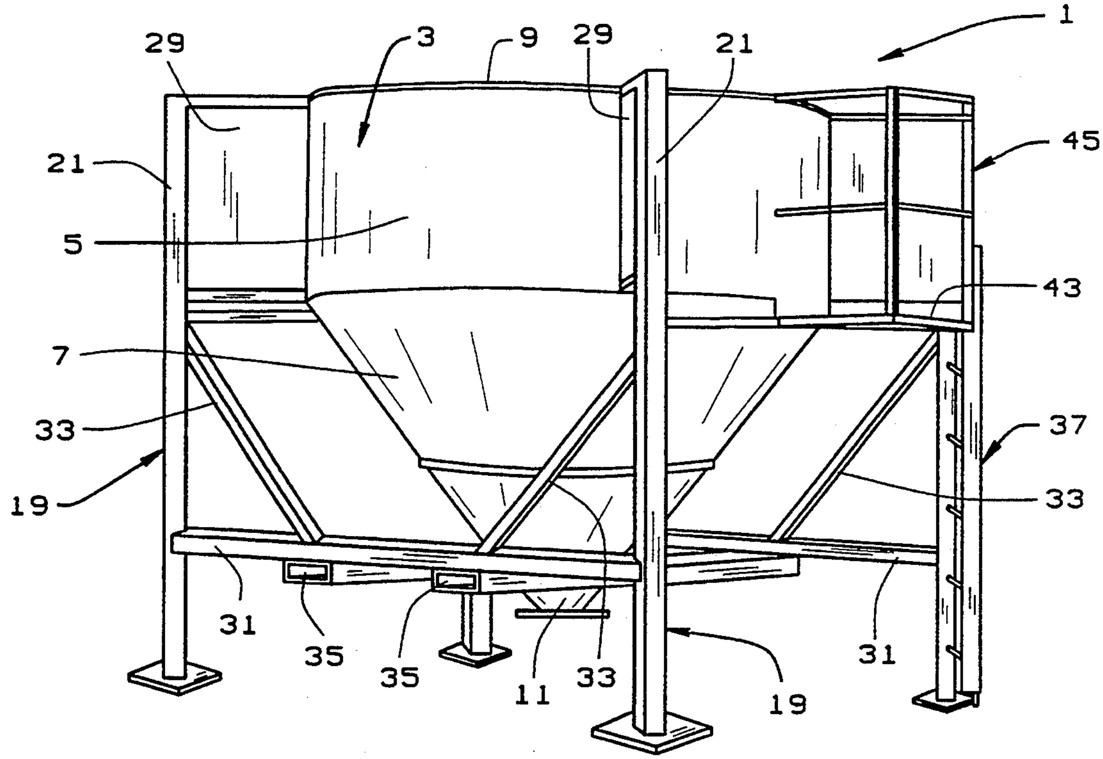
FIG. 3 is a perspective view from a different angle of the portable mini silo system of the present invention in collapsed condition when the telescopic leg elements are collapsed for portability.

Telescopic leg elements 19 are peripherally spaced about and are attached to the upper area 5 of the silo 3 for supporting the silo 3 in an upright position. The telescopic leg elements 19 are constructed for extension, as shown in FIG. 1, in order to support the silo 3 above a supporting surface enabling a batch mixer to be positioned beneath the silo 3 and between the telescopic leg elements 19. The telescopic leg elements 19 are also capable of being collapsed, as shown in FIGS. 2–3, where the portable mini silo system 1 is easily transportable between construction job sites.

Each of the telescopic leg elements 19 include an upper fixed sealed tube 21 and a smaller complementary shaped lower sliding tube 23. The smaller complementary shaped lower sliding tube 23 is capable of telescopically moving within the larger fixed tube 19 for extension and collapse, shown in FIGS. 1–3 of the drawings. For this purpose, a pin 25, at the lower end of the fixed tube 19, is withdrawn from the tube 19 to enable the lower slidable tube 23 of each leg 19 to be positioned at the desired height. As is common, a variety of holes can be formed in each of the lower sliding tubes 23 for selective positioning of the lower tubes 23 relative to the upper fixed tubes 21, to regulate the desired height of the silo 3 above a supporting surface.

The fixed and sliding tubes 21, 23 have an elongated square shape to provide rigidity and durability of the legs in supporting the silo 3. At the lower end of each of the sliding tubes 23 is an enlarged foot 27 which provides a firm and stable support for each of the telescopic leg elements 19, when resting on a supporting surface. Because the lower sliding tubes 23 are relatively movable within the upper fixed tubes 21, there is less opportunity for contamination of foreign particles or the like interfering with the operation of the telescopic leg elements 19.

It will be noted that the telescopic leg elements 19 are laterally outwardly offset from the silo 3 through the use of vertical struts 29 which extend between the upper side wall area 5 and an upper portion of the fixed leg tubes 21. These vertical struts 29 both laterally offset and reinforce the telescopic leg elements 19. As a result, there is more clearance around the batch mixer to facilitate user operation. At the same time, the telescopic leg elements 19 are capable of fully supporting the silo 3 and the weight of the dry mortar blends within the silo.

To assist in providing an integrated structural unit, horizontal struts 31 extend on opposite sides of the silo 3 and are attached to lower portions of adjacent fixed leg elements 21 on opposite sides of the silo 3 to prevent any movement of the telescopic leg elements 19. Diagonal struts 33 also preferably extend between the fixed leg elements 21 and the horizontal struts 31, as best illustrated in FIGS. 2 and 3, to provide additional structural integration and support. Extending between the pair of horizontal struts 31, 31 on opposite sides of the silo 3, are a pair of spaced fork lift tubes 35 which are attached to the horizontal struts 31 on opposite sides of the silo, as best shown in FIGS. 1–3 of the drawings. The vertical strut 29, horizontal struts 31, diagonal struts 33, and horizontal tubes 35, which also serve as fork lift tubes, provide a structurally rigid and reinforced structure interconnecting the silo 3 and the telescopic leg elements 19 in a rigid integrated structure.

A collapsible ladder 37 is attached to one of the telescopic leg elements 19 for collapse and extension as the telescopic leg elements 19 are correspondingly collapsed and extended for portability or operation and use, as indicated above. The collapsible ladder 37 has a fixed upper ladder portion 39 which is attached to one upper fixed leg element 21 and a lower slidable ladder 41 that is attached to the corresponding lower slidable leg of one of the telescopic leg elements 19. As will be seen in the drawings, one vertical section of the upper fixed ladder 39 is actually the upper fixed leg 21, while the lower ladder 41 has two independent vertical sections that are separate from the sliding leg 23. This is necessary in order to enable the lower ladder 41 to be slidably received within the fixed vertical sections of the upper ladder 39.

The collapsible ladder 37 is also attached to a platform 43 that is attached to the silo 3, enabling a user to climb the ladder and stand on the platform 43. As shown in the drawings, the platform 43 is attached to the upper side wall area 5 of the silo, although different areas of attachment may be used, if desired. Preferably, the platform 43 is positioned below the closed upper wall 9 of the silo to enable a user to climb the ladder 37 and stand on the platform 43 to open the loading door 13 for loading or checking the contents of the silo. As indicated above, the loading door 13 is offset to one side of the closed upper wall 9, in proximity to the platform 43. This enables a user to facilitate the loading or checking of the contents of the silo 3.

Figure 5:
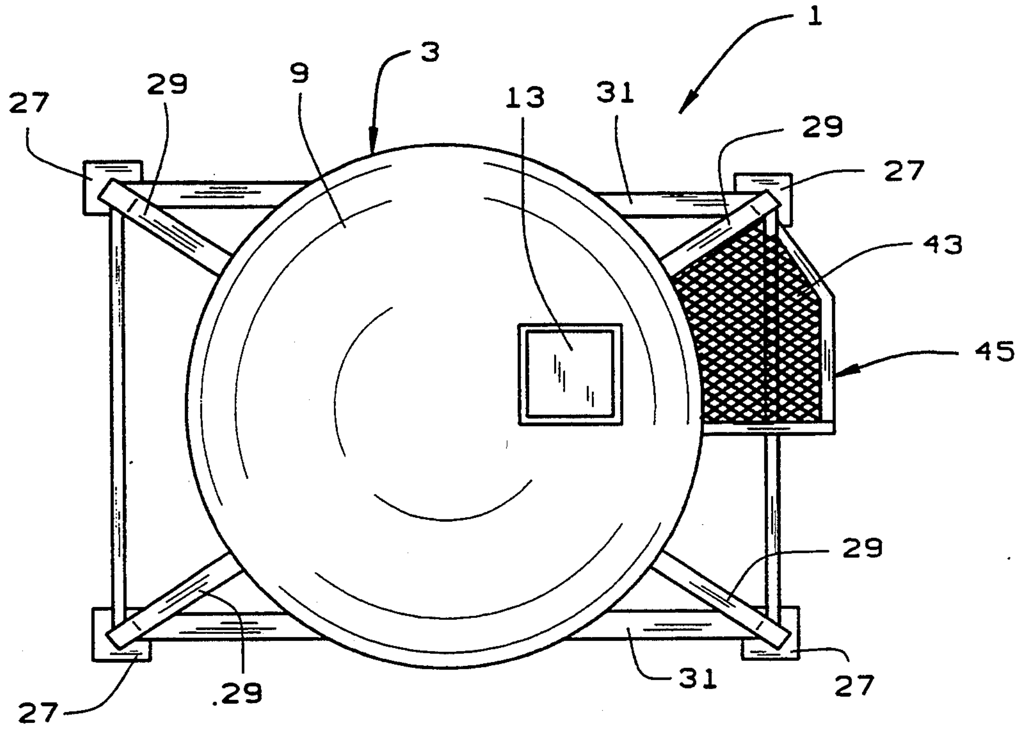
FIG. 5 is a top plan view of the portable mini silo system of the present invention.

The platform 43 includes a guard rail 45 that extends upwardly from the platform 43 along one side and a part of the rear of the platform 43, terminating short of the collapsible ladder 37. A vertical strut 29 from the telescopic leg element 19 that is associated with the collapsible ladder 37 also serves as a guard rail along another side of the platform 43, all of which is seen in FIGS. 1, 3 and 5 of the drawings. Thus, it will be readily apparent that when the collapsible ladder 37 is extended along with the telescopic leg elements 19, as shown in FIG. 1 of the drawings, a user can readily climb the collapsible ladder 37 and stand on the platform 43 for opening the loading door 13.

When standing on the platform 43, the user can empty one or more bags of dry mortar blend material into the silo 3 through the opened loading door 13. This will require the user to travel up and down the collapsible ladder 37 until sufficient quantities of dry mortar blend material are loaded into the silo 3, as desired. In such instances, the dry mortar blend material can be contained in a variety of different bags or containers which are capable of being handled by a user when mounting the collapsible ladder 37 and for loading the dry mortar blend material contents into the silo 3 via the opened loading door 13.

Where the bags are containers of dry mortar blend material are so large, i.e., 3,000 pounds, making it is impossible for a user to lift same, a fork lift can be used to lift such heavy bag or container for charging the contents of the silo 3 via the opened loading door 13. Because the loading door 13 is offset to one side of the upper closed wall 9, a fork lift without an extending boom may be employed for delivering the contents of the bag or container immediately above the opened loading door 13, for discharging same into the silo 3.

A variety of different bags or containers may be employed with or without loops or other means for lifting the same by a fork lift for discharge into the silo through the opened loading door 13. In addition to knit fabric bags and plastic bags, fiberglass or other rigid containers may be employed in carrying and discharging the dry mortar blend materials from the preparation site to the construction site for loading into the container.

Figure 4:
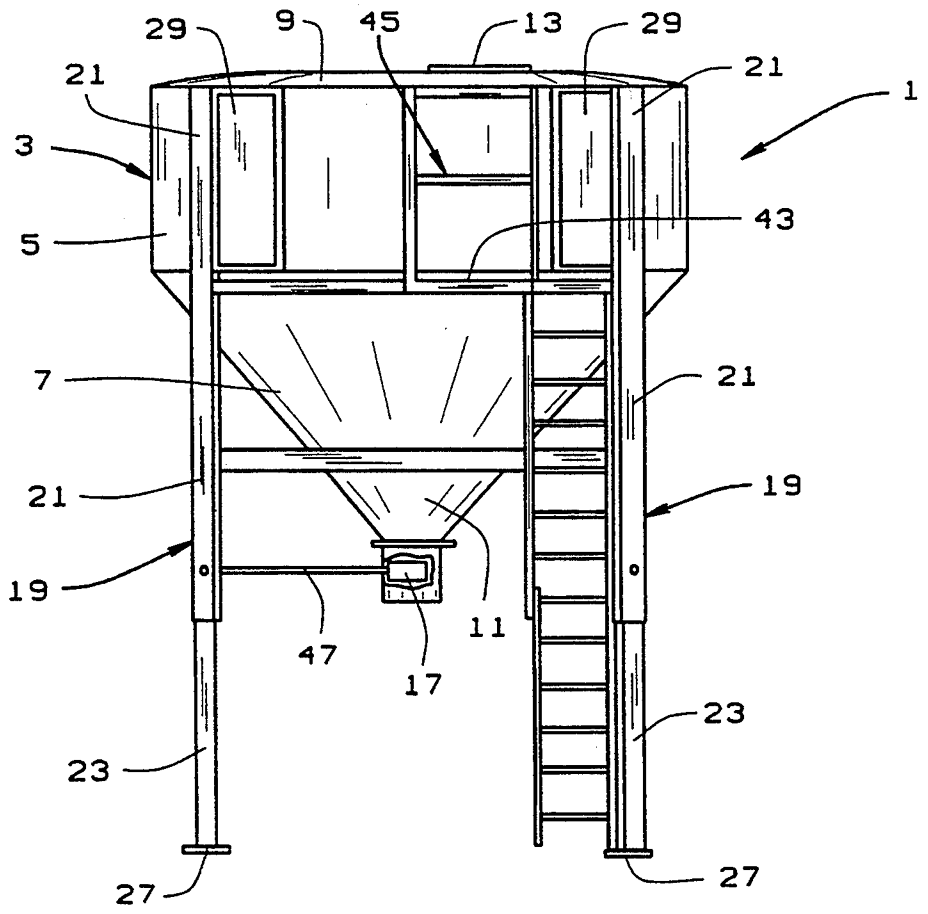
FIG. 4 is a side elevational view of the portable mini silo system of the present invention.

When it is desired to discharge or dispense selective quantities of dry mortar blend material from the silo 3, the valve 17 is operated to allow the dry mortar blend material to fall by gravity through the restricted opening at the lower end of the silo 3. This is best seen in FIG. 4 of the drawings where a manually operated rod 47 can be rotated to operate the valve 17. The valve 17 is preferably an inverted half clam cement valve which has numerous advantages over slide gate or butterfly valves. For example, a half clam cement valve is more weather resistant than other valve types, is better protected from materials splashing from the batch mixer and is easier to operate. Preferably, the valve 17 is operated from the rear of the batch mixer, allowing the operator to clearly see the operation of the batch mixer. In this respect, note that the manually operating rod 47 is attached at one end to the valve 17 and is rotatably mounted to a fixed leg 21 of one of the telescopic leg elements 19. It will also be apparent that the manually operated rod 47 eliminates any labor needed to manually crank an auger to charge a batch mixer as is required in some systems and also eliminates the need for an electric motor to power an electric auger or belt. All that the operator must do is rotate the rod 47 in order to open the half clam cement valve to the degree necessary to discharge the proper amount of material, and then the manually operated rod is rotated back to close the valve 17.

From the foregoing, it will now be appreciated that the portable mini silo system of the present invention provides portability from construction site to construction site while, at the same time, enabling easy loading and quick discharge of dry mortar blend material at the construction site. The spaced telescopic leg elements are collapsible when moving the silo between construction sites and are capable of being extended at the construction site, to enable the silo to be positioned a predetermined distance above the supporting surface. The collapsible ladder is attached to one of the telescopic leg elements to facilitate collapse and extension of the collapsible ladder along with one of the telescopic leg elements. The collapsible ladder is cooperatively associated with a user platform that provides a convenient platform for hand loading or checking the contents of the silo. An offset door is formed in a closed upper wall of the silo near the platform to enable charging or checking the contents of the silo. The offset door also eliminates the need for climbing on top of the silo to charge or check the dry mortar blend level in the silo, as is necessary with certain systems. The structurally integrated vertical and horizontal struts associated with the silo provides a rigid supporting system, while also enabling the telescopic leg elements to be used for collapse and extension, as described above. The overall simplicity of the portable mini silo system, its operational effectiveness in loading and discharging dry mortar blend material from the silo, and its conveniency and efficiency in operation all provide for a highly practical and workable system that meets the needs of both the small contractor, who may hand load the silo, or the larger contractor who uses heavier containers and fork lift trucks to load the silo.

In view of the above, it will be seen that the several objects and features of this invention are achieved and other advantageous results obtained.

As various changes could be made in the above constructions without departing from the scope of the invention, it is intended that all matter contained in the above description or shown in the accompanying drawings shall be interpreted as illustrative and not in a limiting sense.

We claim:

1. A portable mini silo system for delivering dry mortar blends to batch mixers, comprising:

a silo having a peripherally continuous side wall which terminates at an upper end in a closed upper wall, said side wall having a lower area which tapers downwardly and terminates at a lower end in a restricted opening;

loading means associated with said closed upper wall for loading dry mortar blend into said silo;

unloading means associated with said restricted opening for unloading dry mortar blend from said silo into a batch mixer; and telescopic leg elements peripherally spaced about the silo for supporting the silo in an upright position, said leg elements being constructed for telescopic collapse enabling portable movement of the silo and telescopic extension for supporting said silo a predetermined distance above a supporting surface;

a collapsible ladder attached to one of the telescopic leg elements for collapse and extension as said one telescopic leg element is collapsed and extended, said collapsible ladder extending upwardly a sufficient distance to enable a user to load dry mortar blends into said silo through said loading means.

2. A portable mini silo system for delivering dry mortar blends to batch mixers, comprising:

a silo having a peripherally continuous side wall which terminates at an upper end in a closed upper wall, said side wall having a lower area which tapers downwardly and terminates at a lower end in a restricted opening;

telescopic leg elements peripherally spaced about the silo for supporting the silo in an upright position, said leg elements being constructed for telescopic collapse enabling portable movement of the silo and telescopic extension for supporting said silo a predetermined distance above a supporting surface;

a collapsible ladder attached to one of the telescopic leg elements for collapse and extension as said one telescopic leg element is collapsed and extended; and a platform attached to the side wall of the silo below the closed upper wall at the upper end of the silo, said collapsible ladder also being attached to said platform to enable a user to climb the ladder and stand on the platform.

3. A portable mini silo system for delivering dry mortar blends to batch mixers, comprising:

a silo having a peripherally continuous side wall which terminates at an upper end in a closed upper wall, said side wall having a lower area which tapers downwardly and terminates at a lower end in a restricted opening;

telescopic leg elements peripherally spaced about the silo for supporting the silo in an upright position, said leg elements being constructed for telescopic collapse enabling portable movement of the silo and telescopic extension for supporting said silo a predetermined distance above a supporting surface;

a collapsible ladder attached to one of the telescopic leg elements for collapse and extension as said one telescopic leg element is collapsed and extended;

a platform attached to the side wall of the silo below the closed upper wall at the upper end of the silo, said collapsible ladder also being attached to said platform to enable a user to climb the ladder and stand on the platform;

a pivoting loading door mounted to the closed upper wall of the silo for loading dry mortar blend into the silo, said pivoting loading door being laterally offset in the closed upper wall adjacent the platform to facilitate loading and checking the contents of the silo when a user stands on the platform; and a valve cooperating with the restricted opening at the lower end of the silo for selectively dispensing dry mortar blend into a batch mixer as desired.

4. The portable mini silo system as defined in claim 3 wherein the telescopic leg elements are laterally outwardly offset from the silo to provide additional clearance below the silo for operation and use of a portable batch mixer.

5. The portable mini silo system as defined in claim 4 wherein vertical struts are mounted between the silo and the telescopic leg elements to both laterally offset and reinforce the telescopic leg elements relative to the silo.

6. The portable mini silo system as defined in claim 5 and including horizontal struts extending between and attached to adjacent fixed leg portions of the telescopic leg elements.

7. The portable mini silo system as defined in claim 6 and including diagonal struts extending between the fixed leg members and horizontal struts.

8. The portable mini silo system as defined in claim 7 wherein said fixed leg portions comprise tube members which receive sliding leg portions of said telescopic leg elements.

9. The portable mini silo system as defined in claim 8 wherein the platform is also attached to fixed leg portions of adjacent telescopic leg elements.

10. The portable mini silo system as defined in claim 9 wherein a guard rail extends upwardly from the platform along one side and a vertical strut between the silo and an adjacent telescopic leg element serves as a guard rail along another side of said platform.

11. The portable mini silo as defined in claim 10 wherein said valve is connected to a manual operating arm that is located at the rear of a batch mixer mounted between the telescopic leg elements.

12. The portable mini silo system as defined in claim 11 and including horizontally mounted fork lift tubes extending on opposite sides of said silo and mounted to said horizontal struts between said telescopic leg members.

* * * * *